Patented Feb. 16, 1932

1,844,929

UNITED STATES PATENT OFFICE

KARL BROMIG, OF FRANKFORT-ON-THE-MAIN, GERMANY, ASSIGNOR TO DEUTSCHE GOLD- UND SILBER-SCHEIDEANSTALT VORMALS ROESSLER, OF FRANKFORT-ON-THE-MAIN, GERMANY, A CORPORATION

PROCESS FOR OBTAINING BETAINE HYDROCHLORIDE

No Drawing. Application filed November 7, 1927, Serial No. 231,787, and in Germany November 15, 1926.

This invention has for its object the recovery of pure betaine hydrochloride from molasses schlempe and the like.

Up to the present time no satisfactory process has been found for the economic extraction of betaine from molasses sclempe, and like liquors. The chief disadvantages of the known methods are that impure products are obtained and the cost of the process is high because of the use of organic solvents, such as alcohol.

Betaine hydrochloride of great purity and in good yields can be obtained by the process of the present invention which uses only hydrochloric acid.

I have found, that the impurities such as dissolved solids ordinarily present in schlempe and similar liquors may be separated therefrom by fractional precipitation, using hydrochloric acid in such manner that betaine hydrochloride of great purity and in good yields is obtained in the final precipitate.

In accordance with my invention the raw material, for example, molasses schlempe is refluxed with sufficient concentrated, hydrochloric acid to make the solution about 20 to 25% in acidity. The refluxing is continued for about 3 to 8 hours. The precipitate formed is then filtered from the hot solution. This precipitate consists chiefly of humous substances resulting from the decomposition of sugars. On cooling the filtrate, practically all of the alkalies precipitate in the form of their chlorides and are filtered off. The filtrate, containing some alkali chloride, practically all the original glutamic acid, and all the betaine, is now concentrated to about two thirds of its volume and saturated with hydrogen chloride at room temperature or lower. The solution is now allowed to stand for 12 to 36 hours whereupon the glutamic acid separates as the hydrochloride which is filtered off. The precipitated glutamic acid hydrochloride contains only small amounts of alkali chloride. The glutamic acid hydrochloride may be further purified by solution in 10% hydrochloric acid, decolorizing with active charcoal, and precipitating with hydrogen chloride. The acid filtrate from the separation of glutamic acid, containing only small amounts of alkali chlorides, is further concentrated by distillation under reduced pressure until it has lost a quantity of water equal to about one third part of it. Upon standing and cooling, betaine hydrochloric separates from the concentrated solution in crystalline form with yields of 10 to 16% based on the weight of ordinary (1.4 sp. gr.) vinasses used, and of 80 to 90% purity.

The hydrochloric acid required for precipitation of the glutamic acid, and also the betaine, may be added before, during, or after concentration of the solution and may be added in the form of gaseous hydrogen chloride. A further advantage of my process is that it saves the use of excessive amounts of acid because hydrochloric acid is used for separating every one of the products.

My invention is of course applicable to liquors from which glutamic acid has first been separated by other means, as for example, by electrolytic methods. In this case, the concentration ordinarily reached in the step for removal of glutamic acid may first be attained by evaporation, preferably under reduced pressure. Subsequent saturation of the concentrated solution with hydrogen chloride precipitates the alkali chlorides and after these have been filtered off, the filtrate may be treated by further concentration to give betaine hydrochloride as already described.

In order to illustrate my invention the following examples are given:

*Example 1.*—1000 grams of a molasses schlempe of 1.40 specific gravity was refluxed with enough hydrochloric acid to make the solution 25% in acidity, for 5 hours. The hot solution was then filtered from the humous solids and cooled. The potassium chloride which separated upon cooling was filtered off and the filtrate concentrated by means of indirect steam under reduced pressure to two thirds of its volume. The concentrated solution was then cooled to 15° C. and saturated with hydrogen chloride by bubbling the gas through it at the rate of 25 to 35 bubbles per minute for about 30 to 60 minutes. By permitting the saturated solution to stand for 24 hours the glutamic acid hydrochloride crystallized and was filtered off. The filtrate was then concentrated by heating under reduced pressure to the point where it had lost 300 to 400 grams of water. Upon standing and cooling, betaine hydrochloride crystallized out. By filtering, washing, recrystallizing once from water, and drying, a yield of 155 grams of betaine hydrochloride of 85 to 90% purity was obtained.

*Example 2.*—1000 grams of concentrated liquors resulting from the extraction of glutamic acid from schlempe by electrolytic methods, having a specific gravity of 1.100 and containing alkali metal compounds and betaine, was distilled under a pressure of 50 to 70 millimeters mercury until it had lost 300 grams in weight. Then hydrogen chloride was passed into the cool concentrated solution until it became saturated as indicated by escape of hydrochloric acid vapors. The potassium chloride which precipitated was filtered off and the filtrate concentrated by distillation under the same conditions of pressure as before, until the solution had lost 200 grams. After the solution had stood at room temperature for 24 hours the precipitated betaine hydrochloride was filtered off. By passing a vigorous current of hydrogen chloride through the filtrate for some time, a second and smaller batch of crystals was obtained. By combining the two batches of crystals, dissolving, and recrystallizing once from water, there was obtained 60 grams of betaine hydrochloride of 85% purity.

It is obvious that my invention is not to be limited to the specific examples given, since the details given therein may be altered according to the raw materials used, and the quality of product desired, without departing from the spirit of the invention.

What I claim is:

1. A process for obtaining betaine hydrochloride from schlempe and the like which comprises treating said material with strong HCl having an acidity of approximately 25% at an elevated temperature, removing the resulting solids from the liquor, concentrating the liquor by removal of substantial quantities of water therefrom and saturating same with hydrogen chloride, removing glutamic acid hydrochloride, and finally concentrating the remaining liquor to precipitate betaine hydrochloride and recovering betaine hydrochloride therefrom.

2. A process for obtaining betaine hydrochloride from schlempe and the like which comprises treating said material with strong HCl at an elevated temperature, removing the resulting solids from the liquor, concentrating the liquor and saturating same with hydrogen chloride, removing glutamic acid hydrochloride, and finally concentrating the remaining liquor and passing hydrogen chloride therein to recover betaine hydrochloride.

3. A process for obtaining betaine hydrochloride from schlempe and the like which comprises adding sufficient HCl to said material to give an acidity of approximately 25%, heating at an elevated temperature, removing the resulting solids from the liquor, concentrating the liquor to approximately two-thirds of its volume and saturating same with hydrogen chloride, removing glutamic acid hydrochloride, and finally concentrating the remaining liquor to approximately two-thirds of its volume and recovering betaine hydrochloride therefrom.

Signed at Frankfort-on-the-Main, Germany, this 21st day of October, A. D. 1927.

KARL BROMIG.